United States Patent [19]
Umeda et al.

[11] Patent Number: 5,581,547
[45] Date of Patent: Dec. 3, 1996

[54] RANDOM ACCESS COMMUNICATION METHOD BY CDMA AND MOBILE STATION EQUIPMENT USING THE SAME

[75] Inventors: Narumi Umeda, Yokohama; Youichi Douzono; Tadashi Matsumoto, both of Yokosuka, all of Japan

[73] Assignee: NTT Mobile Communications Network Inc., Tokyo, Japan

[21] Appl. No.: 325,318

[22] PCT Filed: Mar. 3, 1994

[86] PCT No.: PCT/JP94/00338

§ 371 Date: Oct. 25, 1994

§ 102(e) Date: Oct. 25, 1994

[87] PCT Pub. No.: WO94/21056

PCT Pub. Date: Sep. 15, 1994

[30] Foreign Application Priority Data

Mar. 5, 1993 [JP] Japan ........................... 5-044236
May 21, 1993 [JP] Japan ........................... 5-119923

[51] Int. Cl.$^6$ ...................................................... H04J 13/00
[52] U.S. Cl. ........................ 370/342; 375/200; 375/203; 375/205; 375/209; 375/309
[58] Field of Search ........................... 370/18, 19, 85.2, 370/85.3; 379/58, 59; 455/33.1, 33.4; 375/200, 201, 202, 203, 204, 205, 206, 207, 208, 209, 210, 309

[56] References Cited

U.S. PATENT DOCUMENTS

| | | |
|---|---|---|
| 4,455,651 | 6/1984 | Baran ............................ 375/203 |
| 4,554,668 | 11/1985 | Deman et al. ...................... 375/1 |
| 4,688,210 | 8/1987 | Eizenhöfer et al. ............... 370/18 |
| 4,701,905 | 10/1987 | Un et al. .......................... 370/18 |
| 5,103,459 | 4/1992 | Gilhousen et al. ............... 375/309 |
| 5,210,771 | 5/1993 | Schaeffer et al. ................ 375/205 |
| 5,216,693 | 6/1993 | Nakamura ........................ 375/209 |
| 5,295,152 | 3/1994 | Gudmundson et al. ............ 375/205 |
| 5,347,535 | 9/1994 | Karasawa et al. ................ 375/205 |
| 5,394,391 | 2/1995 | Chen et al. ....................... 370/19 |

FOREIGN PATENT DOCUMENTS

| | | | |
|---|---|---|---|
| 0095959 | 12/1983 | European Pat. Off. | H04B 7/26 |
| 0428046 | 5/1991 | European Pat. Off. | H04J 13/00 |
| 58-119240 | 7/1983 | Japan | H04B 7/26 |
| 60-148245 | 8/1985 | Japan | H04J 13/00 |
| 4-8047 | 1/1992 | Japan | H04M 1/00 |
| 4-369136 | 12/1992 | Japan | H04L 9/00 |
| 2172777 | 9/1986 | United Kingdom | H04J 13/00 |

*Primary Examiner*—Douglas W. Olms
*Assistant Examiner*—Shick Hom
*Attorney, Agent, or Firm*—Pollock, Vande Sande & Priddy

[57] ABSTRACT

Mobile stations randomly set delay amounts for each message to be sent, on the basis of the timing of a symbol received from a base station, and delay transmission signals for time intervals corresponding to the delay amounts. The base station 11 despreads signals received from the mobile stations to extract basic symbol timing for each mobile station and, at the thus extracted timing, takes each despread output into the corresponding demodulator for demodulation.

28 Claims, 15 Drawing Sheets

RANDOM ACCESS COMMUNICATION METHOD BY CDMA AND MOBILE STATION EQUIPMENT USING THE SAME

TECHNICAL FIELD

The present invention relates to a CDMA (Code Division Multiple Access) random access communication method and mobile station equipment which enable a plurality of mobile stations and a base station to communicate using the same frequency and the same spreading code and permit random access to the base station from the mobile stations.

The service area of a mobile communication system called a cellular system is split into a number of cells, each of which is provided with a base station. Each cell is assigned at least one control channel, in the case of heavy traffic, two or more control channels, and a plurality of communication channels and each mobile station perform communication through the base station of the cell to which the mobile station currently belongs. Each mobile station under contract to receive services is assigned an identification number, and for example, in the case of sending a call originating signal to the base station over the control channel or sending a speech signal to the base station over the communication channel, the mobile station adds its identification number to the information to be sent.

The code division multiple access (CDMA) system that has been employed in the past is a communication system which multiplexes signals to be transmitted at the same frequency, by spectrum spreading them with spreading codes which differ with channels. The system configuration and capabilities of the conventional system are described in detail in a reference literature (R.C. Dixon, "Spread Spectrum Communication System," Jatec Shuppan). Now, a brief description will be given of a direct spreading CDMA system.

In FIG. 1 there is shown the configuration of a base station transmitting device in a typical CDMA communication system. N information sequences S1, S2, . . . , SN are provided to multipliers $41_1, 41_2, \ldots, 41_N$, wherein they are spectrum spread by being multiplied by spreading codes C1, C2, . . . , CN from a spreading code generator 42 which differ with symbols in the information. These spread signals are combined by a combiner 43 at the same timing and the combined output is transmitted by a transmitter 44. At the receiving side, though not shown, the received signals are spectrum-despread by the same spreading codes C1, C2, . . . , CN as those used at the transmitting side, by which the N information sequences are extracted individually. In this case, pseudo-random noise codes of the same code length (chip number) (hereinafter referred to as PN codes) are used as the respective spreading codes.

As is well-known in the art, the PN codes can be generated by, for example, EXCLUSIVE ORing outputs from the last and a desired intermediate stage of a shift register composed of N delay stages, then inputting the EXCLUSIVE OR into the first stage of the shift register and driving it by a clock of a predetermined period (chip period) Tch. In this instance, a random code (an M-sequence code) of a fixed pattern which repeats with the longest $(2^n-1)$ chip period can be obtained according to the position of the intermediate state to be selected and the initial value to be set in the shift register. 1/Tch is called a chip rate and the period Tc of the M-sequence pattern that is generated is $Tc=(2^n-1)Tch$.

In a digital mobile radio communication system, the transmitting timing of the mobile station is synchronized with a signal from the base station. That is, in one cell, each mobile station demodulates the signal sent from the same base station, then generates basic symbol timing for transmission which is synchronized with the symbol timing for transmission from the base station and transmits thereto a signal in synchronization with the basic symbol timing. The symbol mentioned herein is the minimum unit of information that is transmitted in the radio section.

The spreading codes that are needed to construct a large-capacity cellular CDMA system are code sequences which have excellent auto-correlation characteristics, that is, code sequences which, letting the time offset (the phase difference) between two identical code sequences be represented by $\tau$, have high correlation for only $\tau=0$ and low correlation for other values of $\tau$. Moreover, the code sequences are those which are excellent in cross-correlation characteristic, i.e. code sequences which have low correlation with other different code sequences (that is, code sequences of cross-correlation values smaller than a fixed value which is an arbitrary time offset).

However, the number of classes of code sequences which satisfy the above-mentioned requirements of spreading codes, such as excellent auto-correlation and cross-correlation, is small and the number of spreading codes in each class is also small. Accordingly, the conventional CDMA communication system in which a different spreading code is assigned to each channel presents a problem that the number of channels available for use is small.

Assume that one channel is assigned for random access use, that is, only one spreading code is assigned therefor. As shown in FIG. 2A, a plurality of mobile stations $12_1$ through $12_3$ transmit to one base station 11 at the same frequency and using the same spreading code in one cell 10 of a mobile communication network. Let the channel that is determined by the frequency and the spreading code be represented by C1. As shown in FIG. 2B, the information to be sent is provided in units of bursts BST and each message MSG is composed of a plurality of bursts BST. A plurality of such messages MSG provide a sequence of signals SS, for example, a sequence of control signals for controlling operations from originating a cell over the control channel to the completion of the call originating sequence immediately prior to the transition therefrom to communication over the communication channel.

The mobile stations $12_1$ and $12_2$ send such information randomly, and consequently, different signals of the same frequency and the same spreading code may sometimes be sent at the same timing in which case the signals overlap each other (as indicated by clash CLS in FIG. 2B). In this instance, it is very likely that the two signals are not received by the base station receiving device. Moreover, it is customary in the CDMA scheme, with a view to improving channel quality, to control the transmitting power of each mobile station to provide a constant level in the receiving station. On this account, a capture effect cannot be expected, resulting in increased probability of the signals being not received.

Thus, when a plurality of mobile stations use the same spreading code at the same frequency until the end of communication, signals sent from the mobile stations clash with each other and it is very likely that the received signals overlap in the base station, resulting in a substantial reduction of the throughput—this causes serious defects. Namely when the spreading code is assigned to the control channel, the number of mobile stations that can be controlled, that is, the control capacity is small, and when the spreading code is used for packet signal transmission, the channel capacity is small. If a plurality of control channels are provided in the CDMA scheme through use of a plurality of spreading codes as in the case of using a plurality of control channels in the FDMA scheme, each mobile station selects one control channel which is determined by the identification number of the mobile station. For instance, the identification number is divided by the number of control channels and the control channel corresponding to an integral value of the remainder is selected. In this instance, a particular channel may sometimes be selected with such a high frequency that communication over that channel is likely to be interrupted. Conversely speaking, the situation may also arise where a certain channel is selected with a low frequency. Hence, the prior art suffers a problem that the actual signal transmission efficiency is low relative to the transmission capacity provided by all control channels.

An object of the present invention is to provide a CDMA communication scheme in which, in the CDMA mobile communication system when a plurality of mobile stations randomly access a base station at the same frequency to transmit thereto signals, the signals are less likely to clash with each other, and hence can be transmitted to the base station with high efficiency. Another object of the invention is to provide mobile station equipment using the CDMA communication scheme.

SUMMARY OF THE INVENTION

With the code division multiple access communication scheme according to a first aspect of the present invention, a plurality of mobile stations use the same spreading code and each mobile station transmits a sequence of symbols spectrum-spread by the spreading code while delaying them for a randomly selected period relative to the timing synchronized with received symbols derived from the signal received from the base station, and the base station despreads the received signal from the mobile station by the above-mentioned spreading code to obtain a sequence of symbols and separates them according to the timing of their reception.

The mobile station equipment according to a second aspect of the present invention comprises: timing generating means which detects each received symbol from the signal received from the base station and generates basic symbol timing on the basis of the received symbol; information control means which generates the symbol of a signal to be sent, in synchronization with the basic symbol timing; spreading means which spreads a sequence of such symbols of the signal to be sent, by a predetermined spreading code generated with a fixed repetition period; delay means which delays the sequence of spread symbols from the spreading means for a period randomly selected within the period of the spreading code; and transmitting means which transmits the sequence of such spread and delayed symbols.

With the code division multiple access communication scheme according to a third aspect of the present invention, the mobile stations share a plurality of predetermined selectable different spreading codes, and each mobile station selects one of the spreading codes for the signal of information to be sent and transmits the signal after spreading it by the selected spreading code. The base station despreads signals received as a combined wave from the plurality of mobile stations by the plurality of spreading codes, to reconstruct individual pieces of information and separates them in correspondence with the plurality of mobile stations.

The mobile station equipment according to a fourth aspect of the present invention comprises: modulating means which modulates the information to be sent into a sequence of symbols; code generating means which randomly selects and generates a spreading code to be used, from among a plurality of predetermined spreading codes; spreading means which multiplies the generated spreading code and the symbol sequence to generate a spectrum-spread symbol sequence; and transmitting means which transmits the spread symbol sequence.

Thus, according to the first and second aspects of the present invention, since each mobile station transmits the symbol sequence while delaying it for a randomly selected period relative to the timing of the symbol received from the base station, the probability that the signals sent from the plurality of mobile stations clash with each other becomes low, providing increased transmission efficiency.

According to the third and fourth aspects of the present invention, a plurality of spreading codes for random access use are prepared and the plurality of mobile stations share them at the same frequency; in the case of transmitting a signal, each mobile station randomly selects one of the plurality of spreading codes for each predetermined block such as a burst, message or sequence of signals and transmits the signal after spectrum spreading it by the selected spreading code. This averages the utilization factor of each of the channels corresponding to the plurality of spreading codes, and hence improves the overall transmission efficiency.

BEST MODE FOR CARRYING OUT THE INVENTION

Figure 3:
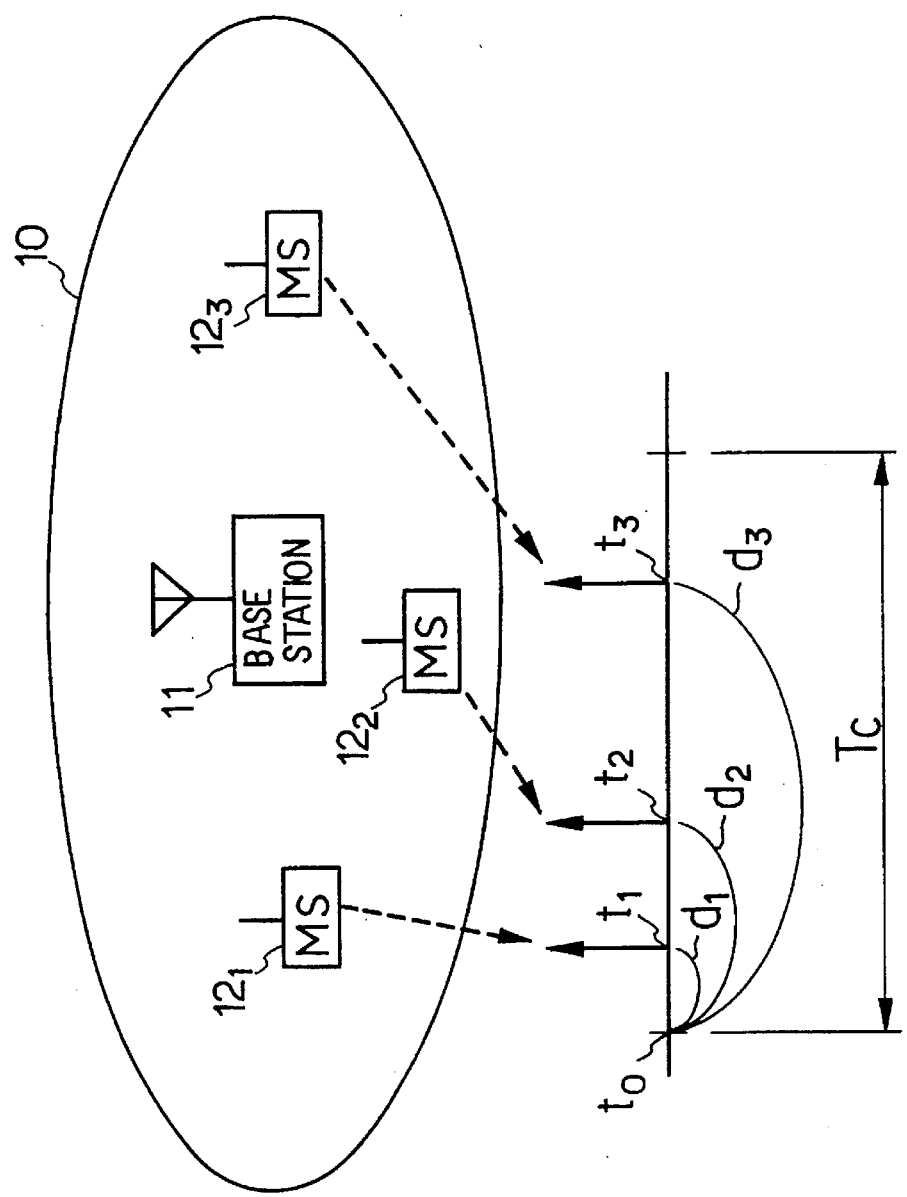
FIG. 3 is a diagram for explaining the method according to the present invention.

A description will be given, with reference to FIG. 3, of an embodiment according to the first aspect of the present invention. In the CDMA system, at least one control channel and a plurality of communication channels are defined by different spreading codes at the same frequency in each cell of the mobile communication network. A base station 11 provided in one cell (a small zone) 10 of the mobile communication network is randomly accessed by a plurality of mobile stations $12_1$, $12_2$ and $12_3$ in the cell 10, using the same spreading code at the same frequency. In this instance, the mobile stations $12_1$, $12_2$ and $12_3$ each detect basic symbol timing of reception from the base station 11 and generate and transmit a signal on the basis of the symbol timing; in the present invention, the symbol transmitting timing differs with the mobile stations. For example, the mobile stations $12_1$, $12_2$ and $12_3$ use, as their basic symbol timing points for transmission, points delayed for time intervals $d_1$, $d_2$ and $d_3$, respectively, behind the basic symbol transmission timing $t_0$ of the base station 11. The delays $d_1$, $d_2$ and $d_3$ are selected in the respective mobile stations to be arbitrary values which are each shorter than the period Tc of the spreading code and an integral multiple (including 0-fold) of the chip period Tch.

Figure 1:
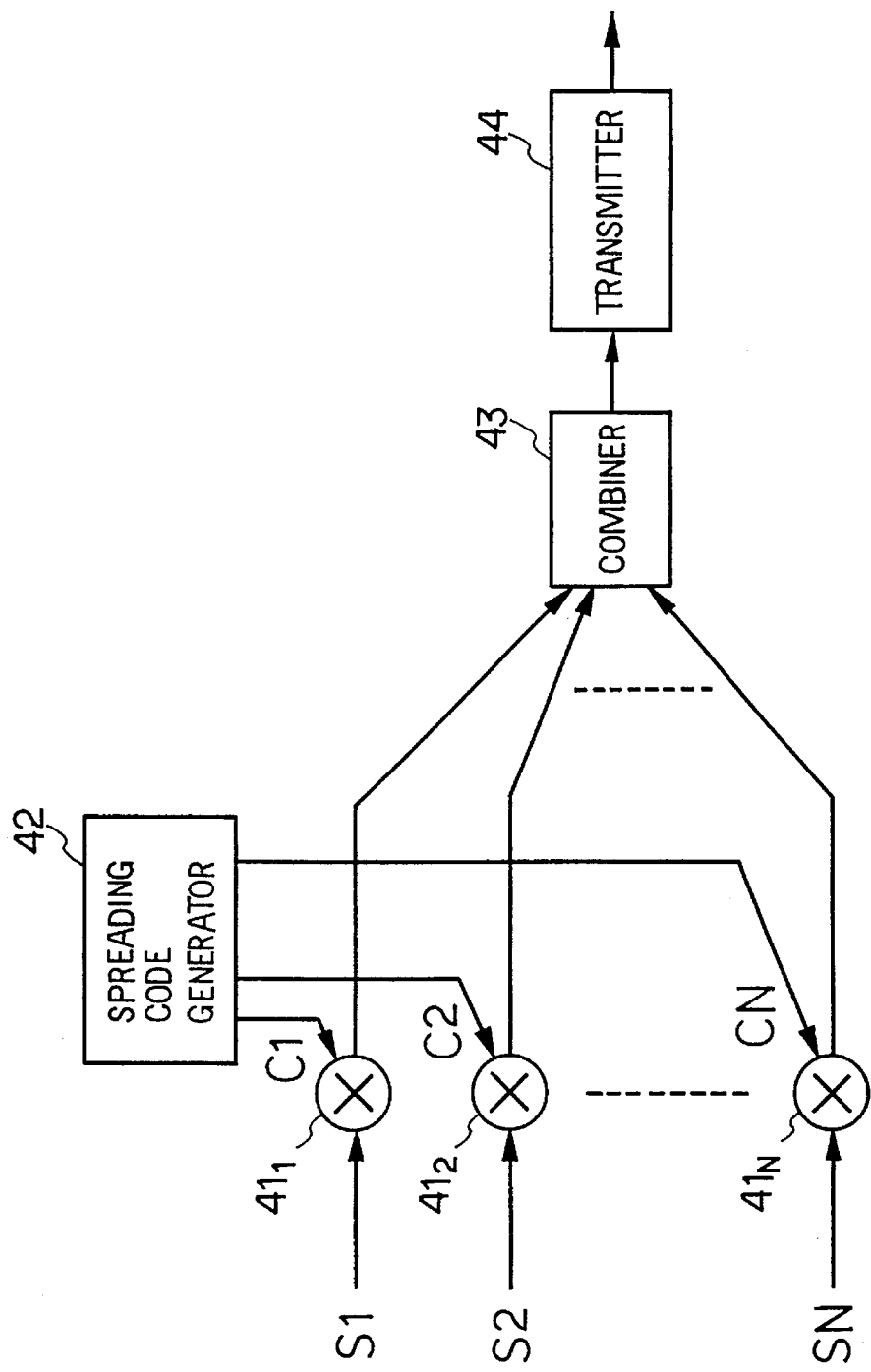
FIG. 1 is a block diagram showing a conventional CDMA transmitting device.

In the present invention, the multipliers $41_1$ through $41_N$ of the transmitting device of the base station shown in FIG. 1 are each supplied with a spreading code of one period length for each M-symbol (M being a predetermined integer equal to or greater than 1) information. For example, when setting M=2, the mobile stations $12_1$ and $12_2$ shown in FIG. 3, for instance, select, as basic symbol transmission timing points, timing $t_1$ and timing $t_2$ which are determined by the delays $d_1$ and $d_2$ shorter than one symbol length Ts, but the mobile station $12_3$ selects timing $t_3$ which is determined by the delay $d_3$ longer than one symbol length Ts. As described later on, the delays $d_1$, $d_2$ and $d_3$ may freely be changed within the range of the spreading code period length Tc for each burst, for each message composed of a plurality of bursts, or for each transmission; alternatively, they may be held unchanged or constant. For instance, in the case of applying the present invention to the transmission of a control signal over a control channel, the transmission timing is changed for each burst or message, and when the signal clashes with a signal from another mobile station, the provision is made to send the signal again as is well-known in the art. In the case of changing the transmitting timing for each message or for each transmission, the timing is selected so that no signal clash will occur.

Figure 4:
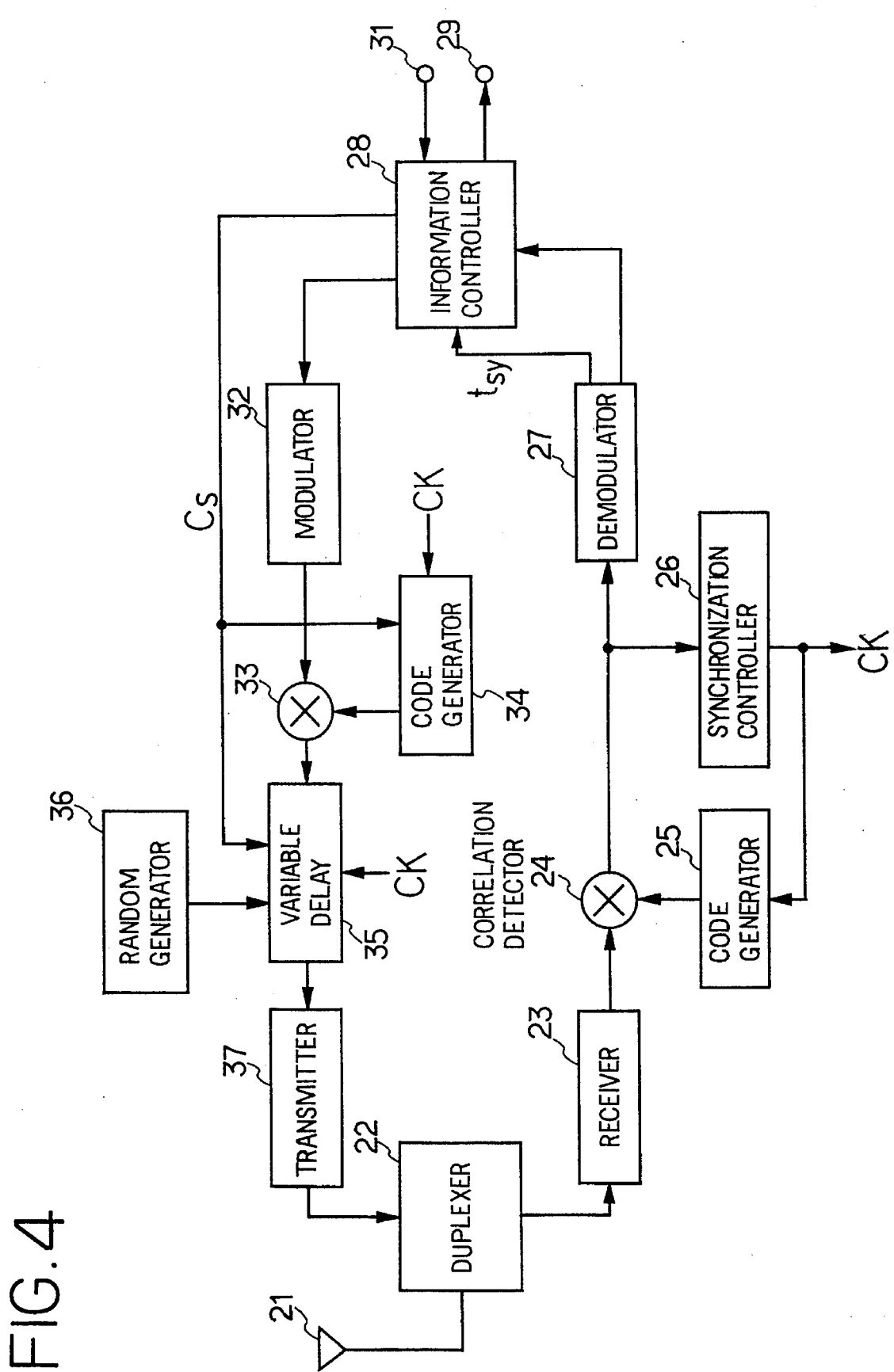
FIG. 4 is a block diagram illustrating the construction of a mobile station embodying the method of the present invention.

The mobile stations $12_1$ through $12_3$ each have such a construction as shown in FIG. 4. The electric wave from the base station 11 is received by an antenna 21 and is fed via a duplexer 22 to a receiver 23, by which it is received and amplified to an intermediate-frequency signal, which is provided to, for example, a sliding type correlation detector 24. A code generator 25 generates a spreading code in synchronization with a chip clock CK regenerated by a synchronization controller 26 and provides the spreading code to the correlation detector 24. The correlation detector 24 detects the degree or magnitude of the correlation between the received signal and the spreading code, and the synchronization controller 26 controls the period Tch of the chip clock CK so that the mean output level of the correlation detector 24 increases. As the result of this, the phase of the spreading code that is generated by the code generator 25 is synchronized with the spreading code component contained in the received signal and a symbol sequence, which is a despread signal, is provided at the output of the correlation detector 24. The despread output is demodulated by a demodulator 27 into a DQPSK output, which is provided as the received signal to a terminal 29 via an information controller 28.

A transmission signal from a terminal 31 is appended with an identification number in the information controller 28 and fed into a modulator 32, which uses the transmission signal to modulate a carrier into DQPSK form, for example. In this case, the information controller 28 determines the basic symbol timing of the transmission signal in synchronization with basic symbol timing $t_{sy}$ of the received signal from the base station 11 which is obtained in the demodulator 27. The modulated output symbol of the modulator 32 is provided to a spreader 33, wherein it is spectrum-spread by being multiplied, for each chip, by the spreading code of a chip number K and a repetition period Tc which is provided from the code generator 34. The spreading code is generated in synchronization with the chip clock CK from the synchronization controller 26 for each message transmission (upon each occurrence of a setting signal Cs from the information controller 28), and the period length Tc of the spreading code is set to be M times (M being a predetermined integer equal to or greater than 1) as long as one symbol length of the modulating signal. The spread output is delayed by a variable delay 35 for an amount preset therein. As referred to previously, the amount of delay takes a value which is smaller than one spreading code period length Tc and is an integral multiple (including 0) of the chip period Tch (=Tc/K); each mobile station selects the delay at will.

Assuming that the chip number K of the spreading code is $K=2^n-1$ the probability that a certain mobile station selects the same amount of delay as that by another mobile station is $1/(2^n-1)$. Accordingly, letting the number of mobile stations having started or starting communication at a certain point in time in the same cell 10 be represented by Z, the probability that two of such mobile stations select the same amount of delay, that is, the probability of a signal clash, is $(Z-1)/(2^n-1)$. This probability could be sufficiently reduced by selecting the value n large.

Figure 5:
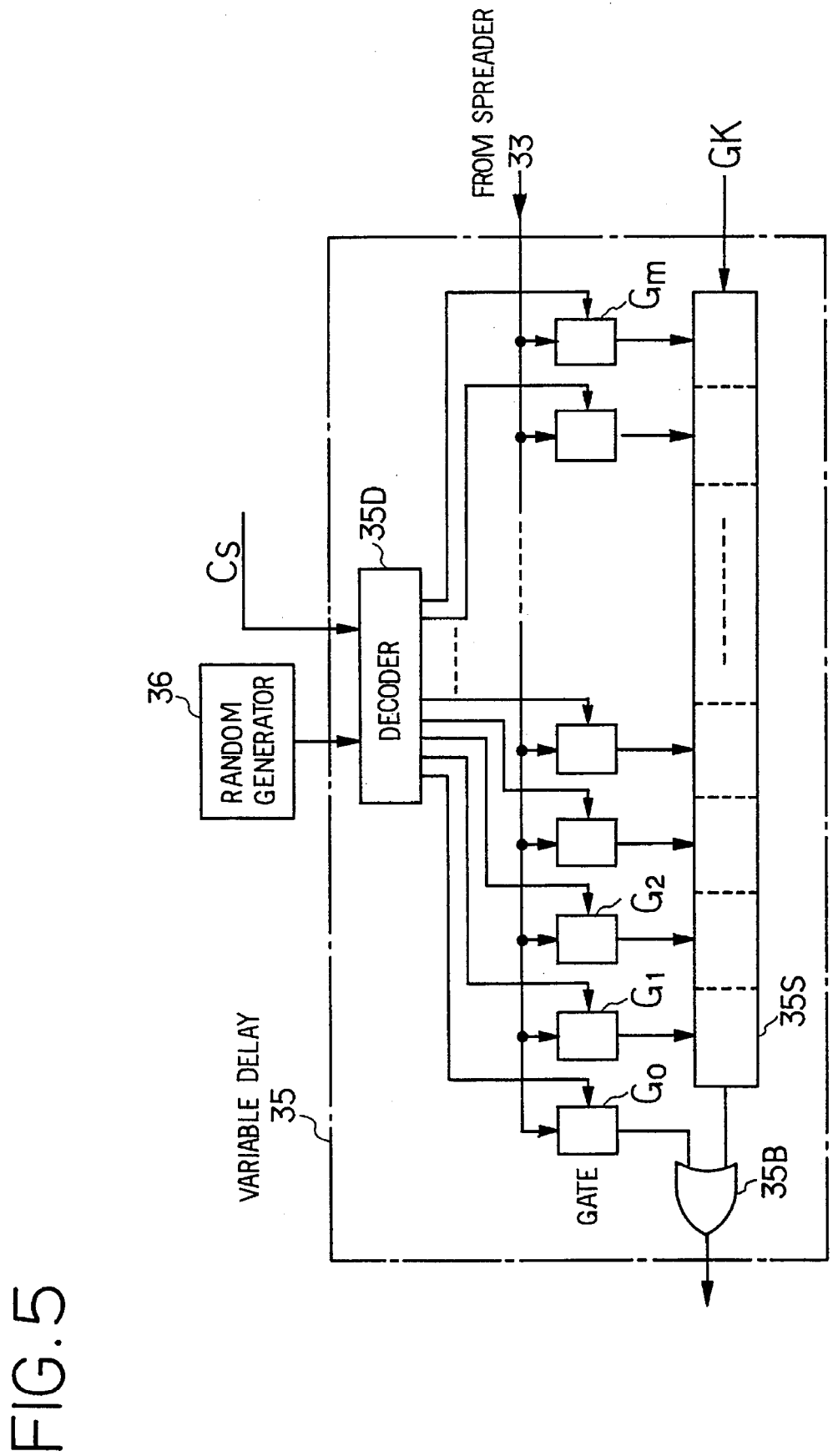
FIG. 5 is a block diagram illustrating a specific operative example of a variable delay 35 in FIG. 4.

This amount of delay is randomly changed for each transmission of one message under the control of the information controller 28. For example, a random generator 36 is provided, and for each message transmission, a random number generated by the random generator 36 is set as the amount of delay in the variable delay 35 by the information controller 28. For example, as shown in FIG. 5, the variable delay 35 has a shift register 35S composed of m shift stages and its output is provided to an OR circuit 35B, whereas the output from the spreader 33 is fed via a gate $G_0$ into the OR circuit 35B and provided as well to first, second, ..., m-th shift stages of the shift register 35S via gates $G_1$ through $G_m$, respectively. The first shift stage is at the side of the OR circuit 35B, and the number m of shift stages is set to a value smaller than the chip number K of the spreading code by one. The random generator 36 randomly generates integers from 0 to m with a fixed period and the random number thus generated is set, by the setting signal Cs from the information controller 28, in a decoder 41 built in the register for each transmission of one message. The decoder 41 enables any one of the gates $G_0$ through $G_m$ in correspondence with the value set in the decoder. The shift register 35S is shifted in synchronization with the chip clock CK (the chip clock of the period Tch) which is used for the generation of a code by a code generator 34. Accordingly, the output spread signal from the spreader 33 is delayed by the variable delay 35 by a multiple of the generated random number of the chip period Tch.

The spread output thus delayed is, as shown in FIG. 4, provided to a transmitter 37, wherein it is converted to the signal frequency for transmission and power-amplified for transmission, thereafter being transmitted to the base station 11 via the duplexer 22 and the antenna 21. Incidentally, the information controller 28 also effects call originating and call incoming control and sets the communication channel (the spreading code for communication use).

Figure 6:
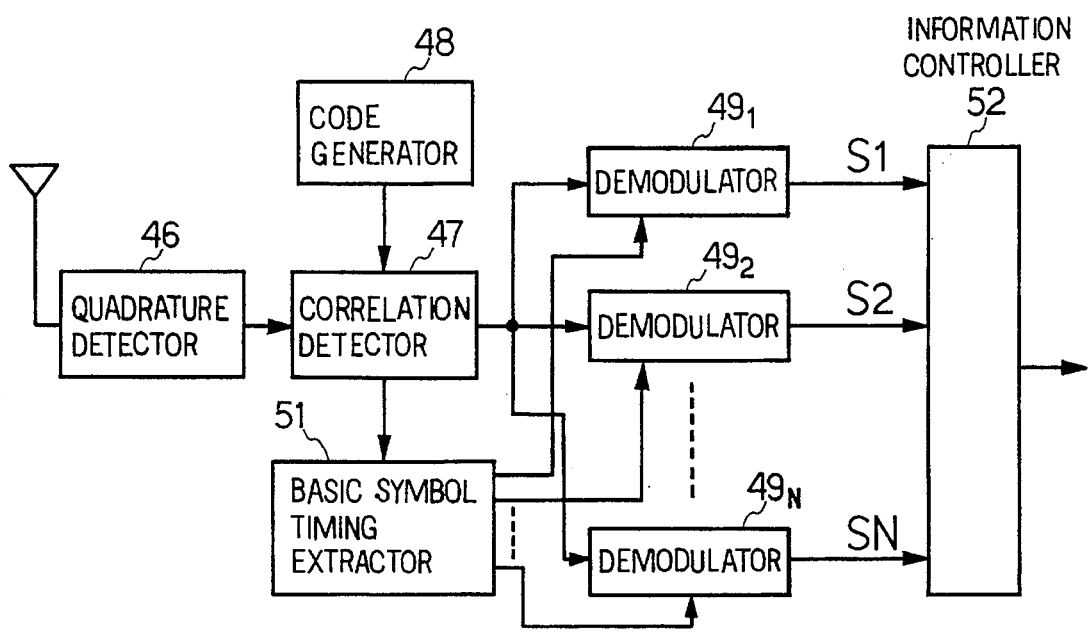
FIG. 6 is a block diagram illustrating the principal part of the construction of a receiving device of a base station in the present invention.
Figure 7:
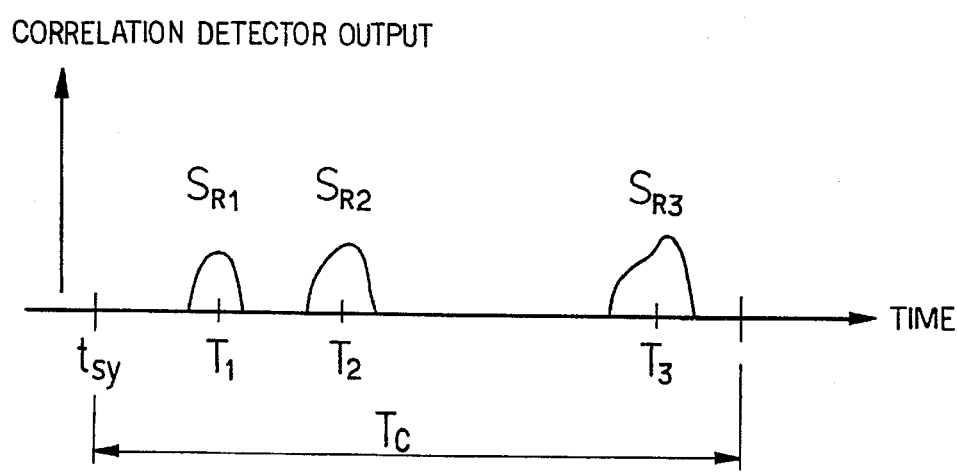
FIG. 7 is a diagram showing an example of the output from a correlation detector 47 in FIG. 6.

In the receiving device of the base station 11, as shown in FIG. 6, the signals sent from the mobile stations $12_1$ through $12_3$ are received as a combined wave by an antenna 45 and detected by a quadrature detector 46 to obtain an in-phase component I and a quadrature component Q. These components I and Q are amplified and converted to intermediate-frequency signals, which are applied to a correlation detector 47 formed by a matched filter, for example. In the correlation detector 47, the intermediate-frequency signals are convoluted by a common spreading code generated by a code generator 48, by which the values of correlation with the components I and Q are detected and square sums of the correlated values are provided upon each occurrence of the chip clock CK. For example, as shown in FIG. 7, the correlation detector 47 provides, at its output, signals $S_{R1}$, $S_{R2}$ and $S_{R3}$ transmitted from the mobile stations $12_1$, $12_2$ and $12_3$ at timing points $t_1$, $t_2$ and $t_3$ defined by the delays $d_1$, $d_2$ and $d_3$, respectively, in the spreading code period Tc. The correlation detected outputs are each applied to a corresponding one of demodulators $49_1$ through $49_N$ and to a basic symbol timing extracting circuit 51. In the timing extracting circuit 51, the basic symbol timing points $t_1$, $t_2$ and $t_3$ of the signals received from the mobile stations $12_1$ through $12_3$ are extracted, and at each symbol timing thus extracted, one of the demodulators $49_1$ through $49_N$ operates. That is, the output from the correlation detector becomes identical with the value of correlation between every received signal and the spreading code, and as depicted in FIG. 7, the output level increases at the points $t_1$, $t_2$ and $t_3$ delayed behind the basic symbol timing for transmission $t_{sy}$ for time intervals $d_1$, $d_2$ and $d_3$, respectively, and the signals from the mobile stations are separated in time and demodulated separately by the individual demodulators. Information sequences S1 through SN from the demodulators $49_1$ through $49_N$ are provided to a controller 52, wherein their identification numbers are discriminated and from which the information sequences are sent to an exchange not shown.

When an ARD demodulator, described in Japanese Patent Application No. 83947/92 entitled "Spread-Spectrum Receiver," is used as each of the demodulators $49_1$ through $49_N$, even if delay profiles overlap to some extent, the influence of the overlapping portion can be eliminated—this permits reduction of the delay interval between basic symbol timing points of the respective mobile stations.

Figure 2A:
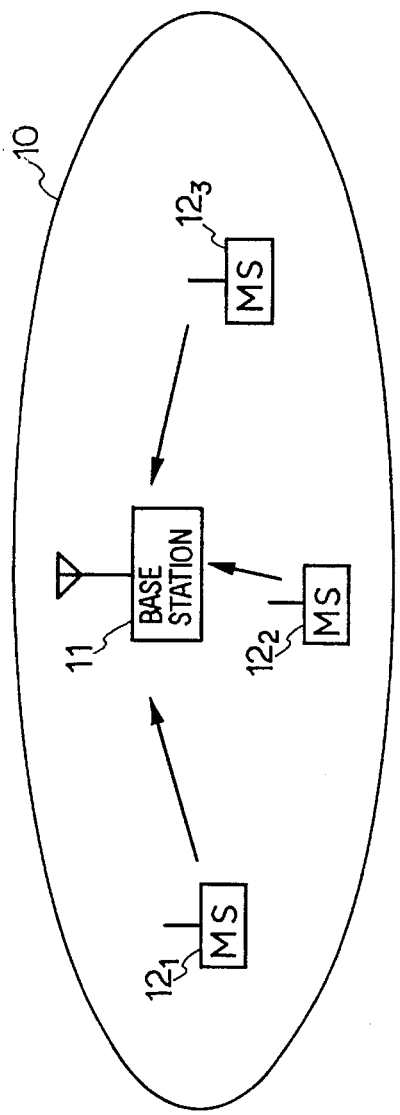
FIG. 2A is a block diagram showing a base station and mobile stations in one radio zone of a conventional mobile communication network.
Figure 8:
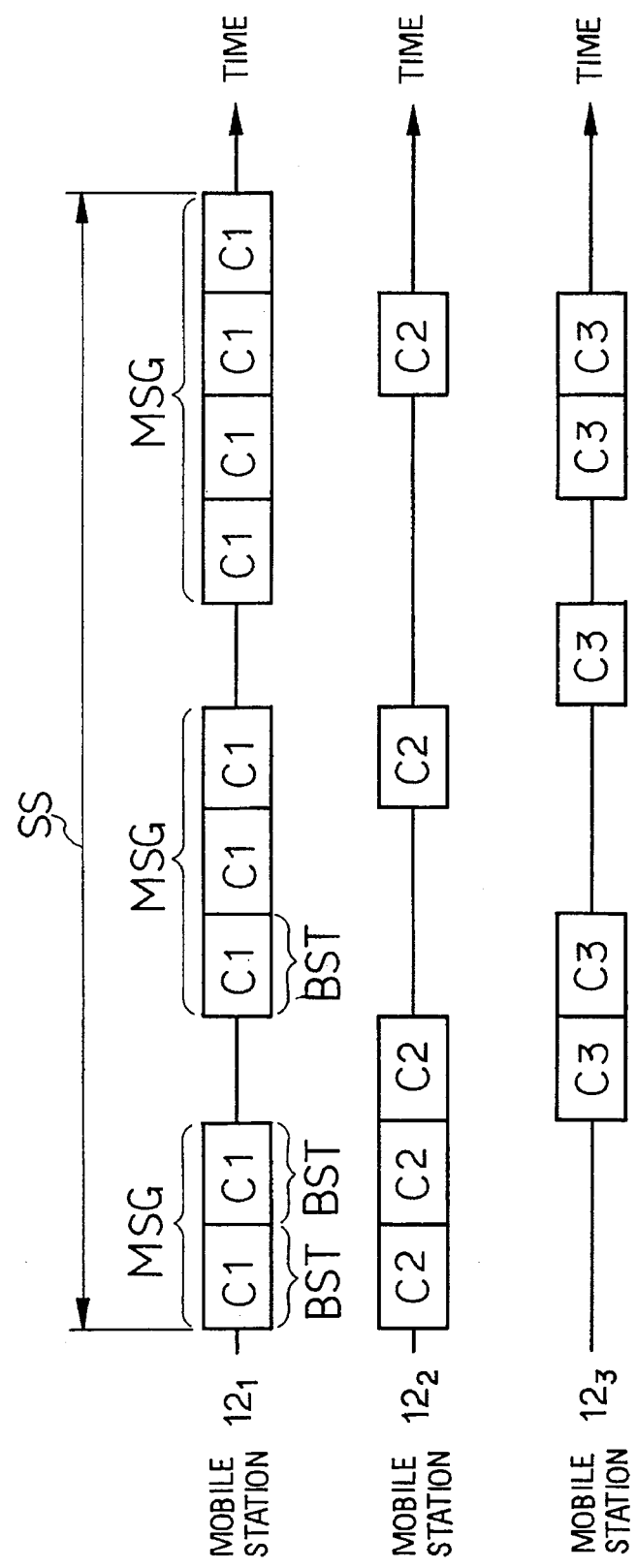
FIG. 8 is a timing chart showing an embodiment in which a mobile station makes random access to a base station while selecting the spreading code for each sequence of signals.

FIG. 8 illustrates another embodiment of the present invention. In this embodiment, a plurality of spreading codes C1 to C3 are provided at the same frequency for random access use. The mobile stations $12_1$ to $12_3$ in FIG. 2A each randomly select one of the spreading codes C1 to C3 when sending a signal; in this example, each mobile station transmits a signal sequence SS composed of a plurality of messages MSG after spectrum-spreading it by the selected spreading code. In the illustrated example, the mobile station $12_1$ is shown to transmit the signal sequence SS composed of three messages MSG to the base station 11 after spreading it by the spreading code C1; the mobile station $12_2$ is shown to select the spreading code C2; and the mobile station $12_3$ is shown to select the spreading code C3.

Figure 9:
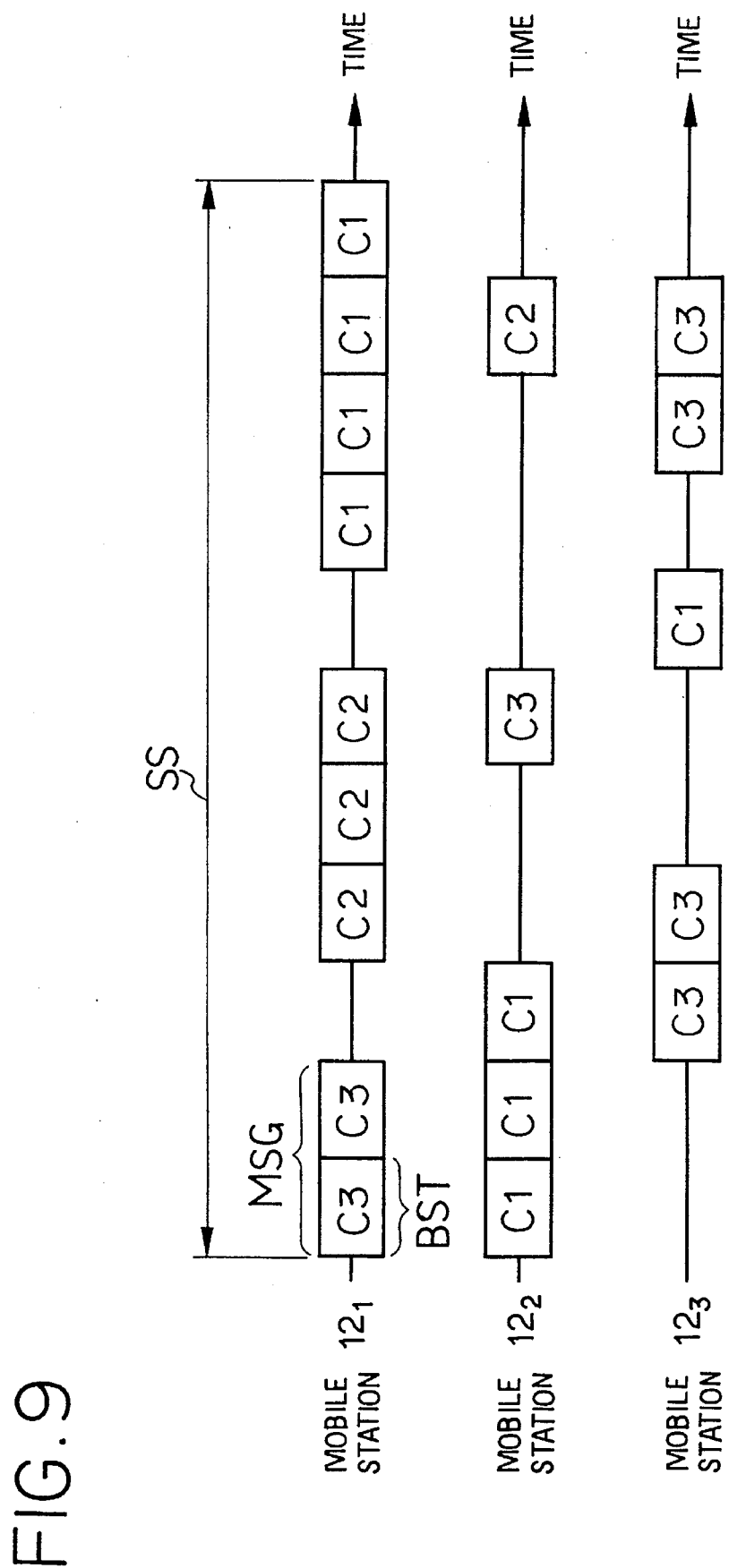
FIG. 9 is a timing chart showing an embodiment in which the mobile station makes random access to the base station while selecting the spreading code for each message.

As shown in FIG. 9, each mobile station may also randomly select one of the spreading codes C1 to C3 for each transmission of one message MSG to the base station 11. Alternatively, each mobile station may randomly select one of the spreading codes C1 to C3 for each burst BST as shown in FIG. 10.

The use of a plurality of spreading codes and the random selection of any one of them by each mobile station, as described above, decreases the probability of signals being transmitted using the same spreading code at the same timing, and hence greatly decreases the signal clash rate. This substantially improves the throughput. The use of a large number of spreading codes will provide increased throughput by the scale effect. Furthermore, even if it happens that the same spreading code is used at the same timing, only the burst or message portions concerned are not received and the entire signal portions do not become unreceived; hence, the unreceived portions of the signals can be minimized. The following table shows, in comparison, the nonreception rate in the case of FIG. 10 in which the spreading code is selected for each burst and the nonreception rate in the prior art example of FIG. 2B.

Figure 2B:
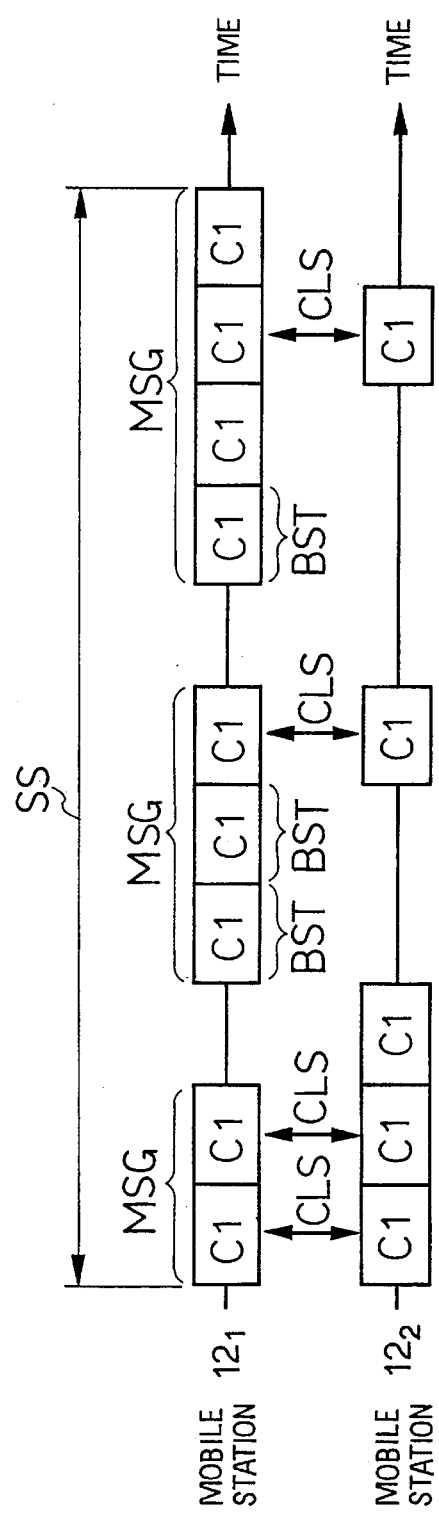
FIG. 2B is a timing chart showing conventional CDMA random access control.
Figure 10:
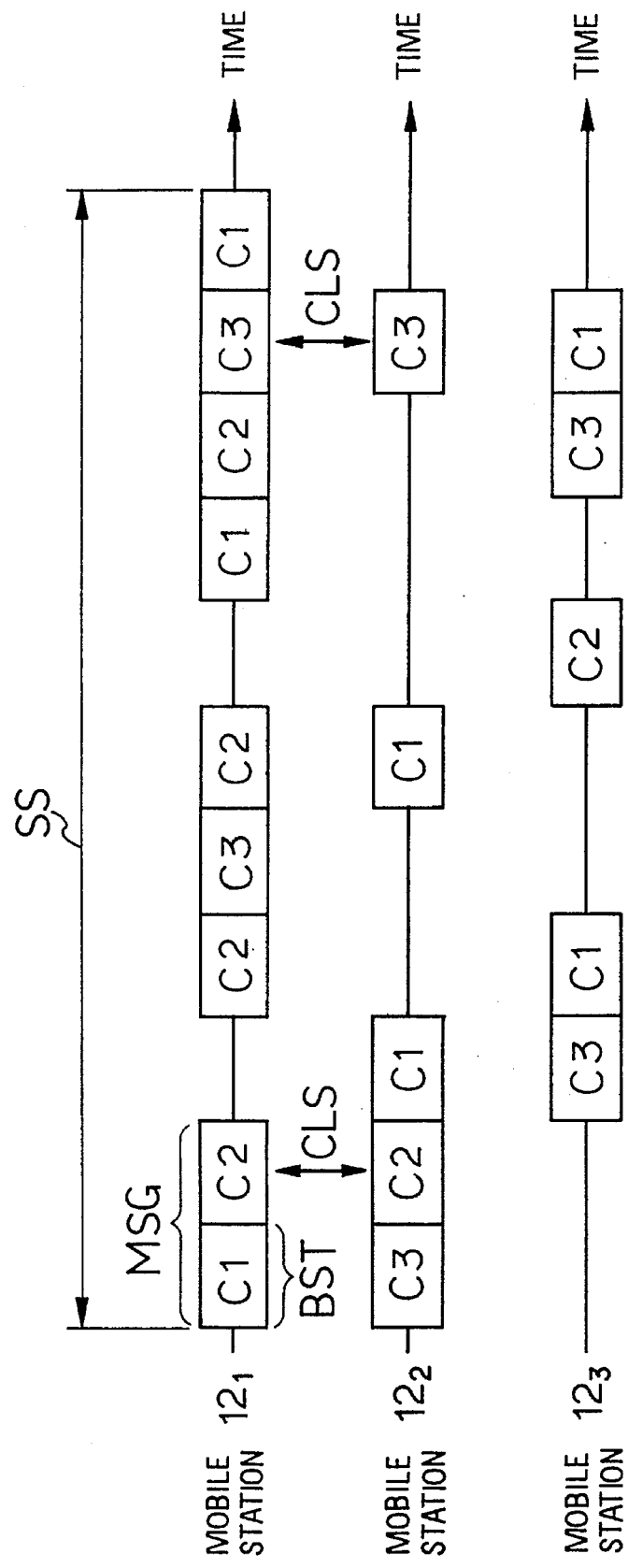
FIG. 10 is a timing chart showing an embodiment in which the mobile station makes random access to the base station while selecting the spreading code for each burst.

|  | FIG. 2B (prior art) | FIG. 10 (this invention) |
| --- | --- | --- |
| Number of bursts transmitted | 9 | 9 |
| Number of burst clashes | 4 | 2 |
| Nonreception rate | 44.4 | 22.2 |

The above shows how many bursts for the transmission of a sequence of signals from the mobile station $12_1$ become the spreading codes common to the mobile station $12_2$ at the same timing and are not received by the base station. Thus, the nonreception rate of the mobile station 12 shown in FIG. 10 is improved 50% over the nonreception rate of the mobile station $12_1$ in FIG. 8B; hence, an outstanding effect is produced.

Figure 11:
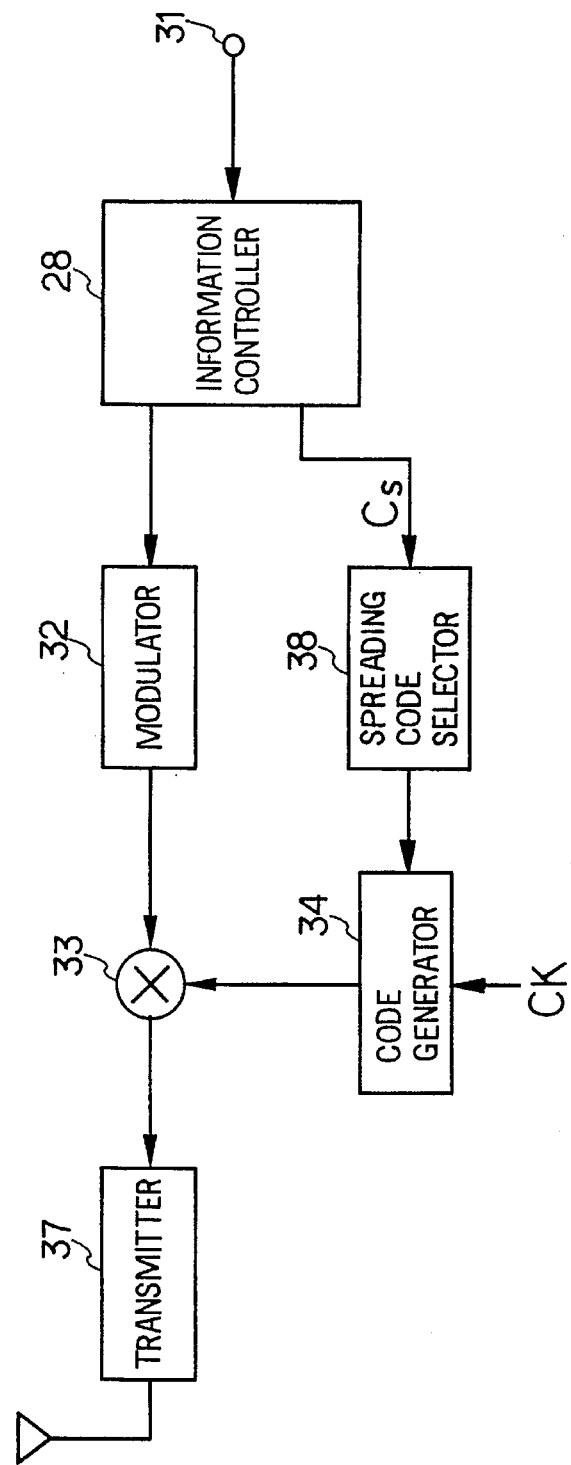
FIG. 11 is a block diagram illustrating an example of a transmitting device for the mobile station.

The transmitting part of each mobile station has such a construction as shown in FIG. 11, for example. The receiving part is the same as that depicted in FIG. 4, and hence is not illustrated. The transmission signal from the terminal 31 is appended with an identification number in the information controller 28 and is provided to the modulator 32. At the same time, upon each application of the transmission signal to the information controller 28, the setting signal Cs is applied to a spreading code selector 38 from the information controller 28. The modulator 32 modulates the carrier by the transmission signal to a DQPSK signal, for instance. Upon each application thereto of the setting signal Cs, the spreading code selector 38 randomly selects one of the spreading code numbers and indicates the selected code number to the code generator 34. The code generator 34 generates the spreading code corresponding to the code number received from the spreading code selector 38. The modulated signal from the modulator 32 is fed into the spreader 33, wherein it is spectrum-spread by being multiplied by the spreading code from the code generator 32, thereafter being sent to the transmitter 37.

Figure 12:
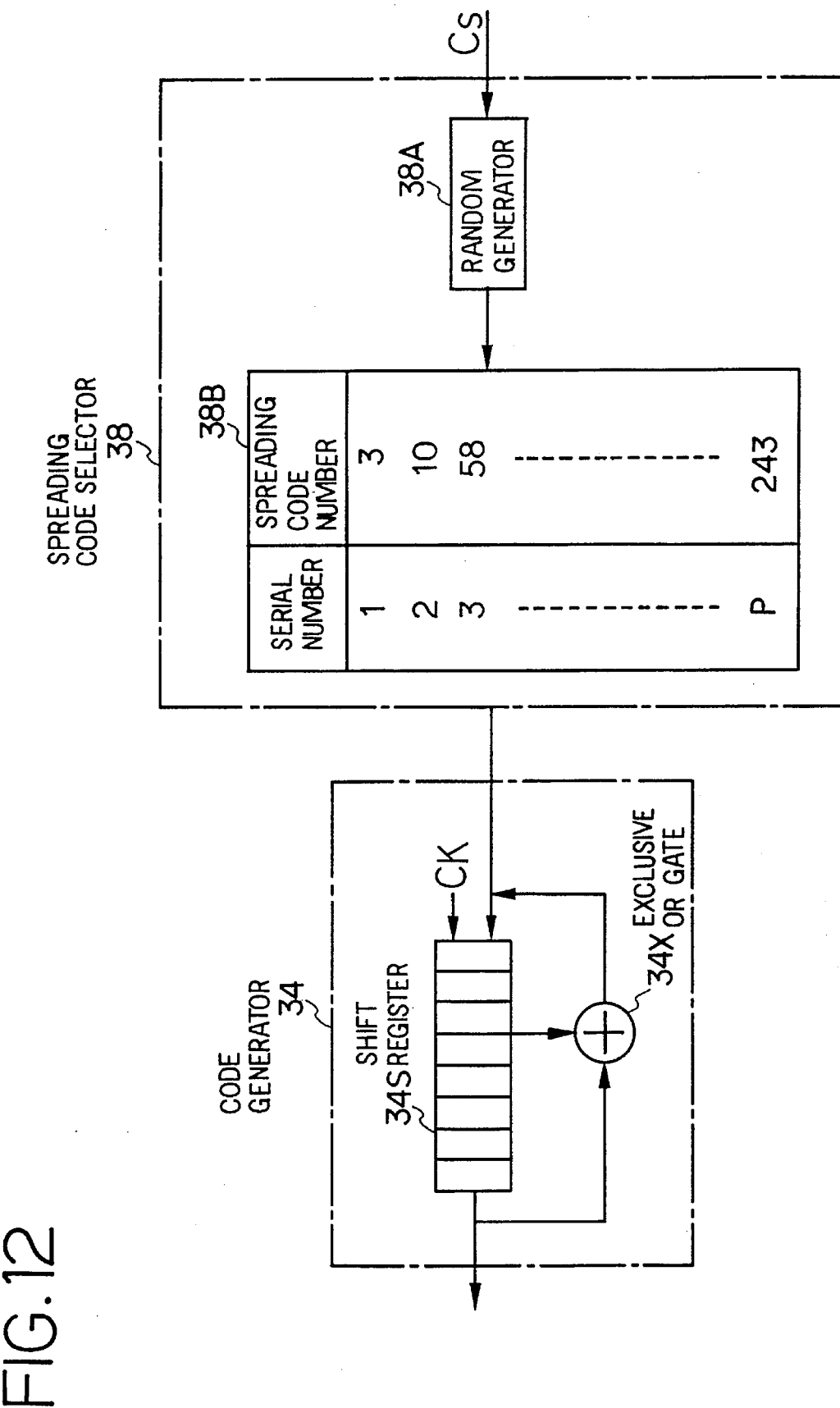
FIG. 12 is a block diagram illustrating a specific operative example of a spreading code selector 24 in FIG. 11.

To randomly select the spreading code number, the spreading code selector 38 comprises, for example, as shown in FIG. 12 a random generating part 38A for generating random numbers and a spreading code number table 38B showing the relationships between spreading code numbers for random access use, assigned to each mobile station, and the serial numbers corresponding to the spreading code numbers. The random generating part 38A is triggered by the setting signal Cs from the information controller 28 to generate a random number and one of p spreading code numbers in the spreading code number table 38B is randomly selected corresponding to the random number. The maximum value of the random number is p, and in the case of the table 38B, when the random number is 3, for example, the spreading code number 58 is indicated to the code generator 34.

As the spreading code number, there is selected a proper initial value which is set in an n-stage shift register for the PN code generation. That is, as depicted in FIG. 12, the PN code generator 34 comprised of the aforementioned n-stage shift register 34S and exclusive OR gate 34X is capable of generating different PN codes according to the n-bit value that is initialized in the shift register 34S; but, according to the selection of the initial value, the PN code generator generates identical PN codes of different phases, PN codes of different lengths, or PN codes of high correlation with each other. It is usually desirable that the spreading code for use in the CDMA scheme be, for example, an M sequence or Gold sequence which has a long repetition period (large in the number of chips of the PN code) and is low in cross-correlation. To meet this requirement, p (where p is an integer equal to or greater than 2) n-bit initial values are preselected which generate different PN codes of the same code length (the same chip number) and low cross-correlation, these initial values are appended with serial numbers 1 through p and a table showing their relationships is held in the memory 38B.

In general, the number p of the initial values which provide actually usable spreading codes is small as compared with the number $2^n$ of values that the n bits may take. Accordingly, by using such a construction as depicted in FIG. 12 in which the spreading code numbers represented as initial values are appended with the serial numbers 1 through p and are selectively read out by randomly generating the serial numbers, the circuit scale of the random generator 38A can be held small. Moreover, only initial values that generate spreading codes satisfying particular requirements, such as initial values corresponding to spreading codes which have low correlation between codes, can be held in the table 38B. In a low traffic cell, since the number of spreading codes that are used within an allowable signal clash rate can be reduced, it is possible to set the maximum value of the random number by the random generator 38A to a value p' smaller than p and generate random numbers within the range of between 1 and p'.

The output spectrum-spread by the spreader 33 with the spreading codes thus generated in sequence is converted by the transmitter 37 in FIG. 11 to the transmission frequency and power-amplified, thereafter being transmitted to the base station.

Figure 13:
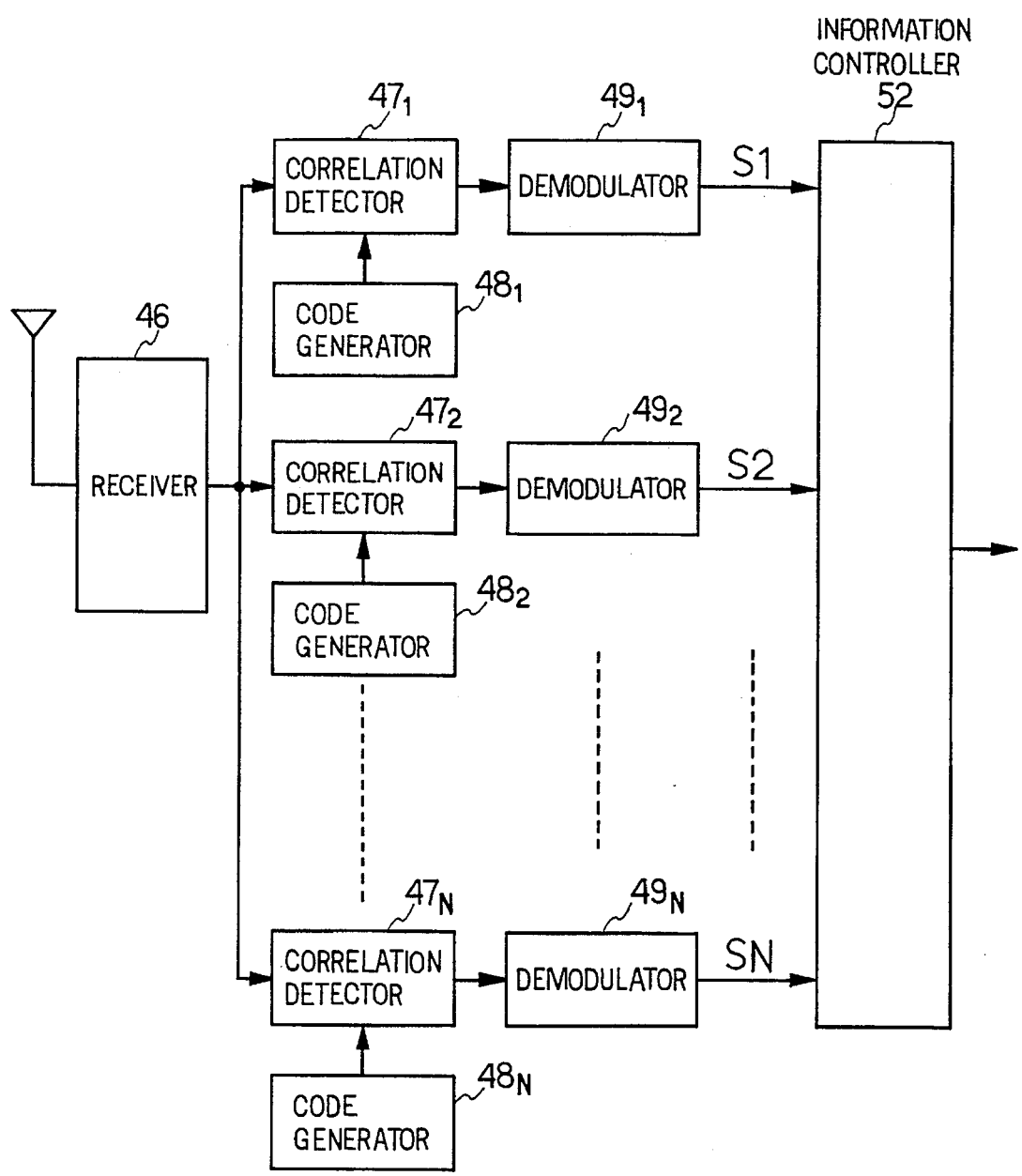
FIG. 13 is a block diagram illustrating the construction of a receiving device of a base station 11 for use in the embodiment of FIG. 8, 9, or 10.

In the receiving device of the base station, as depicted in FIG. 13, correlation detectors $47_1$ through $47_N$ and code generators $48_1$ through $48_N$ of the same number as the number p of the spreading codes for random access use are prepared. Signals from the mobile stations, received by a receiver 46 formed by a quadrature detector, are despread by the correlation detectors $47_1$ through $47_N$ for the respective spreading codes and information sequences are reconstructed by respective demodulators $49_1$ through $49_N$. These information sequences are received as signals from the mobile stations which differ for each signal sequence SS, for each burst BST, or for each message MSG that the mobile stations send. A controller 52 selects pieces of information from the same mobile station from among the information sequences randomly outputted from the demodulators $49_1$ through $49_N$, rearranges the selected pieces of information on the basis of the identification numbers contained therein and outputs each information sequence in correspondence with the respective mobile station.

Figure 14:
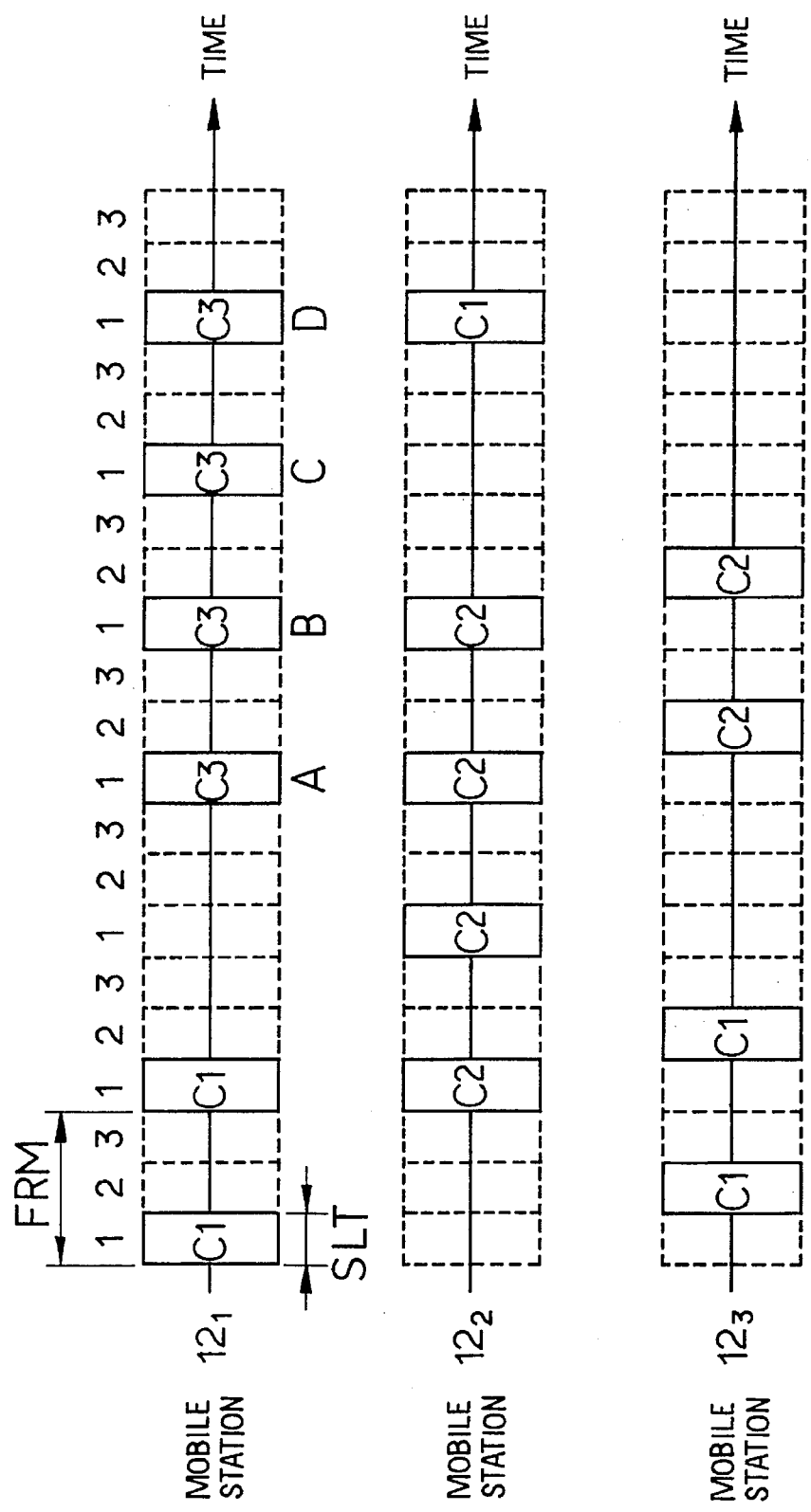
FIG. 14 is a timing chart showing the application of the FIG. 9 embodiment to a time division CDMA random access scheme.

FIG. 14 shows an example of the application of the present invention to the case where the time division multiplex scheme and the CDMA scheme are used in combination. A plurality of mobile stations randomly select a plurality of spreading codes provided for random access use at the same frequency and send them to the base station; in this instance, a frame FRM is repeated and each frame is composed of a plurality, three in this example, of slots SLT, each corresponding to one burst BST. Each mobile station receives basic timing from the base station and transmits the spectrum-spread signal to the base station at predetermined time intervals through one slot in the frame. The mobile station transmits with the spreading code randomly selected for each signal sequence SS, for each message MSG, or for each slot SLT=burst BST. In this embodiment, the spreading code is selected for each message MSG. In the case of the mobile station $12_1$ in FIG. 14, bursts (slots) A, B, C and D constitute one message. Also in this embodiment, the use of a plurality of spreading codes and randomly selective transmission of the spreading codes by the mobile station will reduce the probability that signals are transmitted using the same spreading code at the same timing; hence, the signal clash rate can substantially be reduced.

Figure 15:
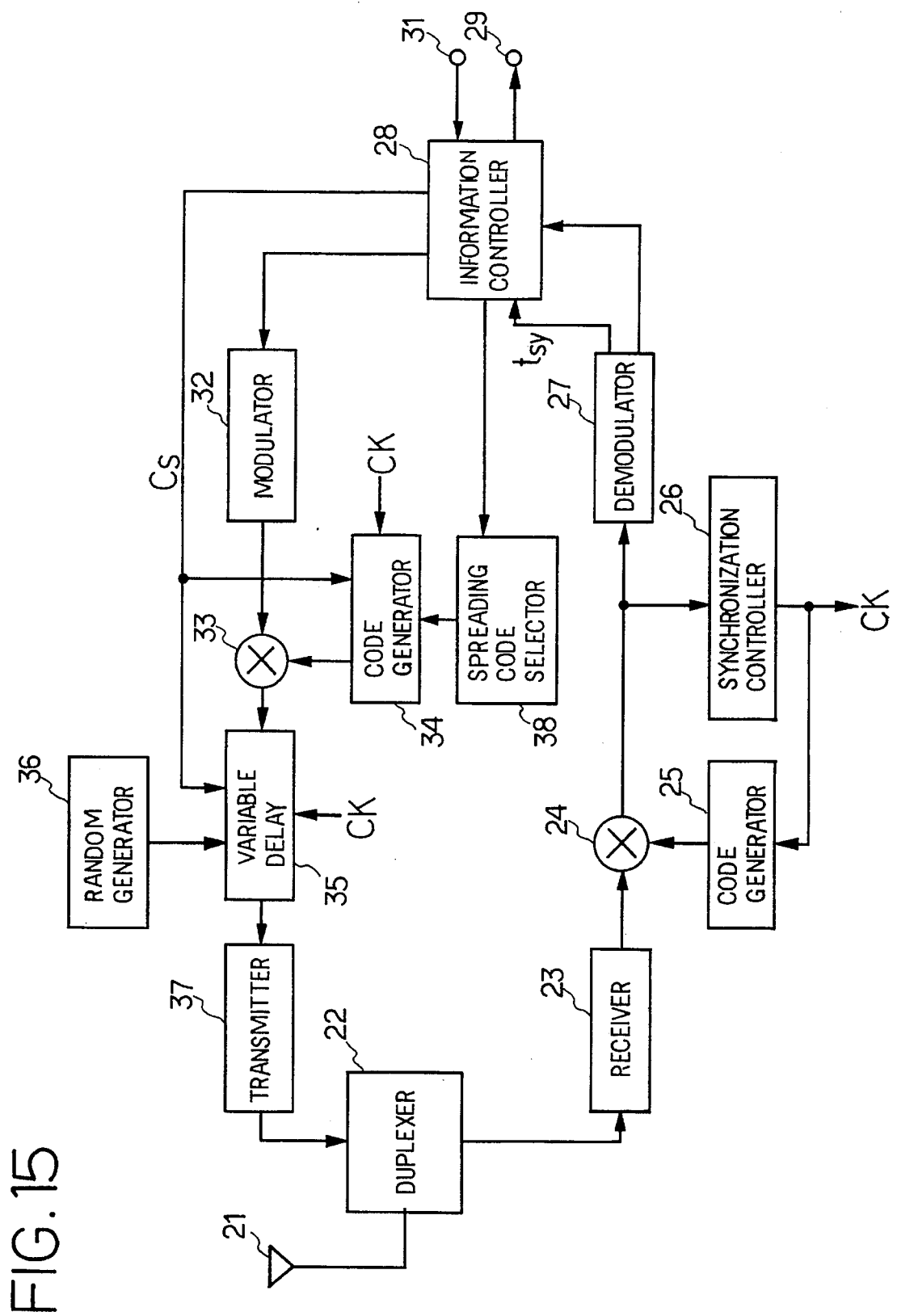
FIG. 15 is a block diagram illustrating an embodiment which randomly selects the spreading code at the sending side in the FIG. 4 embodiment.
Figure 16:
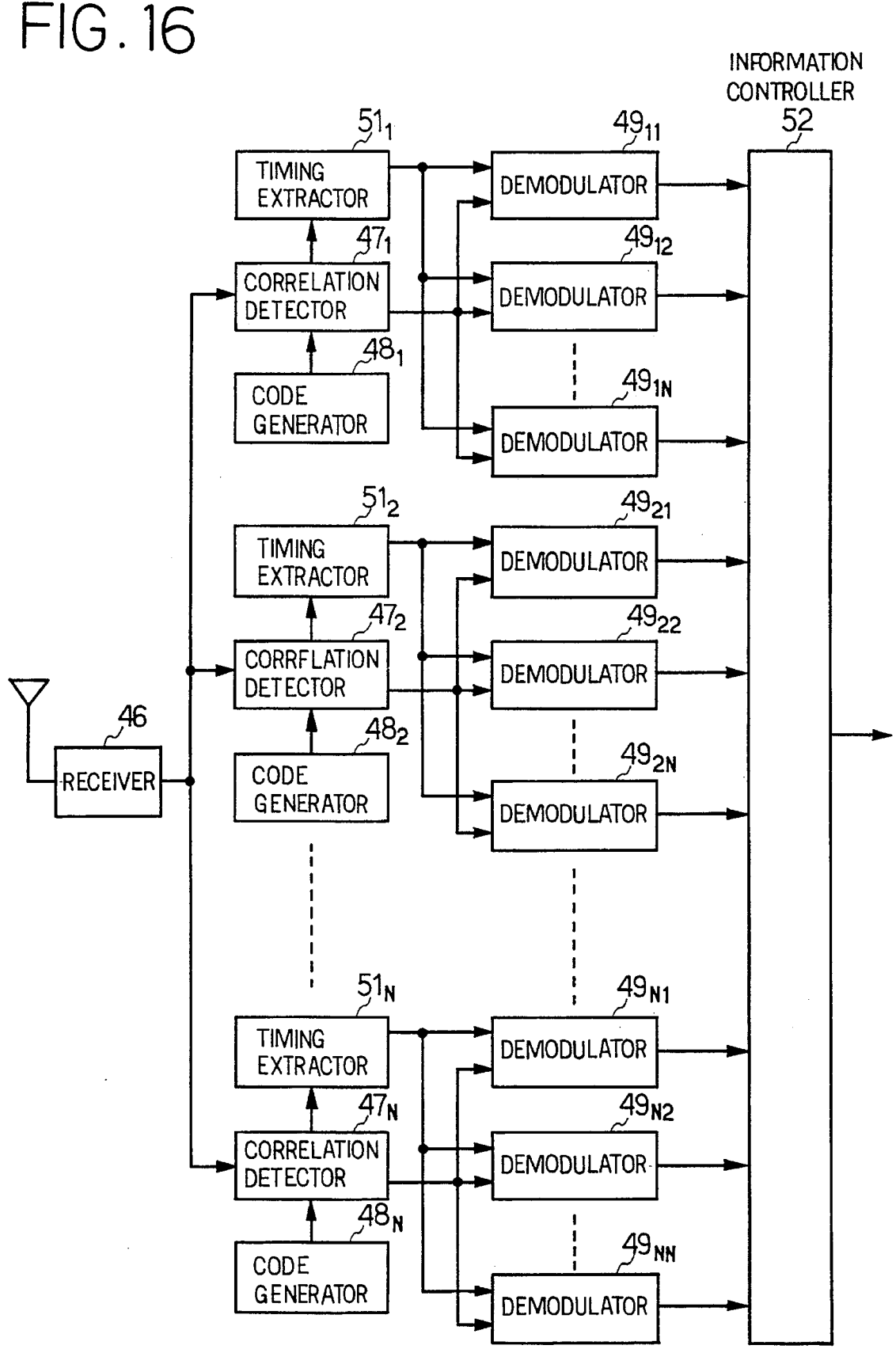
FIG. 16 is a block diagram illustrating the construction of the receiving part of the base station corresponding to the FIG. 15 embodiment.

The method of randomly selecting the spreading codes, described previously with reference to FIGS. 8 through 13, may be combined with the method of randomly selecting the delays as described in respect of FIGS. 3 through 7. The construction of the mobile station in such a case is shown in FIG. 15 and the construction of the base station (only the receiving side) in FIG. 16. In FIG. 15, the code generator 34 shown in FIG. 4 is formed by the code generator 34 and the spreading code selector 38 used in FIG. 11. In this instance, the delay and the spreading code may be selected in response to the same setting signal Cs, or in combination of two of each burst, each message and each signal sequence. The other operations are the same as those in the case of FIG. 4, and hence will not be described again. The structure shown in FIG. 16 is one wherein, in the FIG. 13 embodiment, basic symbol timing extractors $51_1$ through $51_N$ corresponding to the correlation detectors $47_1$ through $47_N$ and demodulators $49_{11}$ through $49_{NN}$ of the same number as that of selectable delays (the same as the number N of selectable spreading codes in the FIG. 16 example) are provided as in the case of FIG. 6.

As described above, according to the first and second aspects of the present invention, even if the same frequency and the same spreading code are used, the possibility of signals clashing with each other can be reduced very low by using different symbol timing for each mobile station; accordingly, even if the same spreading code is used as a channel for which a number of mobile stations compete, the throughput does not appreciably decrease.

According to the third and fourth aspects of the present invention, a plurality of mobile stations share a plurality of spreading codes for random access use at the same frequency and randomly select the spreading codes for each signal sequence, for each message, or for each burst, by which the possibility of signals clashing with each other can be reduced; accordingly, even if the same spreading code is used as a channel for which a number of mobile stations compete, the throughput can substantially be improved in the packet signal transmission or control channel.

Having thus described our invention, we claim:

1. A random access communication method which performs communications between a base station and a plurality of mobiles stations using channels of the same frequency and the same spreading code for sending signals in a code division multiple access communication system, said method comprising the following steps:

A. each of said mobile stations spectrum-spreads a sequence of symbols using said spreading code to produce a sequence of spectrum-spread symbols, delays the sequence of spectrum-spread symbols by a randomly selected amount on the basis of the timing synchronized with a received symbol obtained from a signal received from said base station, and transmits the delayed sequence of spectrum-spread symbols; and B. said base station despreads signals received from said mobile stations by said spreading code to obtain a sequence of received symbols and separates said symbols in accordance with the timing of their reception.

2. The method of claim 1, wherein said steps of spectrum-spreading, delaying and transmitting by each of said mobile stations further includes the steps of:

1) generating basic symbol timing in synchronization with a symbol obtained by receiving the signal sent from said base station;

2) generating a symbol of the signal to be sent, in synchronization with said basic symbol timing;

3) spectrum-spreading a sequence of symbols of said signal to be sent, by multiplying them by a sequence of chips of said spreading code one after another;

4) delaying said sequence of spectrum-spread symbols by an amount randomly selected by said each mobile station within the period length of said spreading code, on the basis of said basic symbol timing; and 5) transmitting said sequence of spectrum-spread and delayed symbols.

3. The method of claim 2, wherein said steps of despreading and separating by said base station further include the steps of:

1) detecting the degree of magnitude of correlation between signals received as a combined wave from said plurality of mobile stations and said spreading code;

2) extracting the timing of the symbols received from said mobile stations in the period length of said spreading code;

3) selecting and separating said received symbols at said received symbol timing corresponding thereto; and 4) demodulating said separated received symbols to an information sequence.

4. The method of claim 2 or 3, wherein the period length of said spreading code is M times as long as said symbol, where M is a predetermined integer equal to or greater than 1.

5. The method of claim 2 or 3, wherein said amount of delay is an integral multiple, greater than 0, of the chip period of said spreading code.

6. The method of claim 1, which further includes a step wherein each mobile station randomly selects said amount of delay for each burst of said signal to be sent.

7. The method of claim 1, which further includes a step wherein each mobile station randomly selects said amount of delay for each message composed of a sequence of bursts of said signal to be sent.

8. The method of claim 1, which further includes a step wherein each mobile station randomly selects said amount of delay for each transmission of said signal to be sent.

9. The method of claim 1, 2, 6, 7, or 8, which further includes a step wherein each mobile station adds an identification number of its own to the information to be sent and modulates it to generate said symbol sequence.

10. The method of claim 9, which further includes a step wherein said base station demodulates said despread received symbol sequence to obtain information sequences and arranges them into information for each mobile station on the basis of the identification number contained in each of said information sequences.

11. Mobile station equipment using a method for random access communication between a base station and a plurality of mobile stations by a code division multiple access scheme, said equipment comprising:

detecting means which detects a sequence of received symbols from a signal received from said base station;

demodulating means for demodulating the sequence of received symbols and producing basic symbol timing on the basis of the received symbols;

information control means which generates a sequence of symbols of a signal to be sent, in synchronization with said basic symbol timing;

spreading means which spreads the sequence of symbols of said signal to be sent to produce a sequence of spread symbols, by a predetermined spreading code generated with a fixed repetitive period;

delay means which delays said sequence of spread symbols from said spreading means by an amount randomly selected within the period length of said spreading code to produce a sequence of spread and delayed symbols; and transmitting means which transmits said sequence of spread and delayed symbols.

12. The equipment of claim 11, wherein said delay means comprises: delay select means for randomly selecting one of a plurality of possible delays; and delay setting means for delaying said sequence of spread symbols by said selected delay.

13. The equipment of claim 12, wherein said spreading code is composed of a predetermined number of chips and said delay select means comprises random generating means for generating a random number, a shift register having a predetermined number of shift stages and driven in synchronization with the generation of each chip of said spreading code, and gate means connected to the inputs of the respective shift stages of said shift register and the output thereof to provide said sequence of spread symbols from said spreading means to one of said shift stages selected corresponding to said random number or the output of said shift register, whereby said sequence of spread symbols are delayed by an amount corresponding to said random number and outputted from said shift register.

14. The equipment of claim 13, wherein said gate means includes decoder means which is supplied with said random number and selectively enables the corresponding one of said gate means to provide therethrough said sequence of spread symbols to the corresponding one of said shift stages or the output of said shift register.

15. The equipment of claim 13 or 14, wherein the number of shift stages of said shift register is smaller than the number of chips of said spreading code by one and said shift register is driven by a clock of the same period as the chip period of said spreading code.

16. A random access communication method which performs communication between a plurality of mobile stations and a base station by a code division multiple random access scheme, wherein said mobile stations share a plurality of predetermined spreading codes, said method comprising the following steps:

A. each of said plurality of mobile stations randomly selects one of said spreading codes for a signal of information to be sent, spreads said signal by said selected one spreading code and sends said signal; and B. said base station receives the signals from said plurality of mobile stations, as a combined wave, despreads said signals by said plurality of spreading codes to reconstruct said information as reconstructed information and separates said reconstructed information in correspondence with said plurality of mobile stations.

17. The method of claim 16, wherein said spreading codes are each formed by a predetermined number of chips and said step A by each of said mobile stations further includes steps of: adding an identification number of said mobile station to said information to be sent; modulating said information added with said identification number and generating a sequence of symbols with a fixed period; repetitively generating said selected spreading code with a period which is an integral multiple of the period of said symbols; multiplying a sequence of chips of said spreading code by said symbols to generate a sequence of spectrum-spread symbols; and transmitting said sequence of spread symbols.

18. The method of claim 16 or 17, wherein initial values for generating said plurality of spreading codes are prestored in a memory in correspondence with serial numbers, respectively, and said step of selecting said spreading code by said each mobile station comprises steps of: randomly generating said serial numbers of said initial values one by one; reading out from said memory the initial value corresponding to said generated serial number; and generating the corresponding spreading code by said read-out initial value.

19. The method of claim 16 or 17, wherein said spreading code is selected for each burst of the signal to be sent.

20. The method of claim 16 or 17, wherein said spreading code is selected for each message composed of a plurality of bursts of said signal to be sent.

21. The method of claim 16 or 17, wherein said spreading code is selected for each transmission of a signal composed of a sequence of messages.

22. Mobile station equipment which uses a random access communication method for performing communication between a plurality of mobile stations and a base station by a code division multiple random access scheme, said equipment comprising:

modulating means for modulating information to be sent to a sequence of symbols;

code generating means for randomly selecting, from a plurality of predetermined spreading codes, a spreading code to be used and generating said spreading code;

spreading means for multiplying said spreading code and said sequence of symbols to generate a sequence of spectrum-spread symbols; and transmitting means for transmitting said sequence of spectrum-spread symbols.

23. The equipment of claim 22, wherein said code generating means comprises: random generating means for randomly generating serial numbers corresponding to said plurality of spreading codes; memory means for storing initial values corresponding to said plurality of spreading codes in correspondence with said serial numbers, respectively; and a code generator in which an initial value read out from said memory means corresponding to the serial number generated by said random generating means is set, for generating the spreading code corresponding to said initial value set therein.

24. The method of claim 16 or 17, wherein said step A by said each mobile station includes a step wherein said sequence of symbols spectrum-spread by said spreading code are delayed by a randomly selected amount on the basis of the timing synchronized with the received symbol derived from the received signal from said base station, and said step B by said base station includes a step wherein a sequence of received symbols, obtained by despreading the received signal from said mobile station are separated in accordance with the timing of their reception.

25. The method of claim 24, wherein said delay amount is randomly selected within the period length of said spreading code.

26. The equipment of claim 22, which further comprises timing generating means for detecting a received symbol from a signal received from said base station and for generating basic symbol timing on the basis of said received symbol, information control means for generating the symbol of said signal to be sent in synchronization with said basic symbol timing, and delay means for delaying said sequence of spread symbols from said spreading means by an amount randomly selected within the period length of said spreading code on the basis of said basic symbol timing, and wherein said transmitting means transmits said sequence of spread and delayed symbols.

27. The equipment of claim 26, wherein said delay means comprises delay select means for randomly selecting one of a plurality of possible delay amounts, and delay setting means for delaying said sequence of spread symbols by said selected amount.

28. The equipment of claim 27, wherein said spreading codes are each composed of a predetermined number p' chips and said delay select means comprises random generating means for generating a random number, a shift register having a predetermined number of shift stages and driven in synchronization with the generation of each chip of said spreading code, and gate means connected to the inputs of the respective shift stages of said shift register and the output thereof to provide said sequence of spread symbols from said spreading means to one of said shift stages selected corresponding to said random number or the output of said shift register, whereby said sequence of spread symbols are delayed by an amount corresponding to said random number and outputted from said shift register.

* * * * *